Mar. 27, 1923.

1,449,704

J. H. STALEY

PISTON AND CONNECTING ROD ALIGNING DEVICE

Filed Nov. 24, 1919

Inventor,
Joseph H. Staley,
By Joseph A. Minturn
Attorney.

Patented Mar. 27, 1923.

1,449,704

UNITED STATES PATENT OFFICE.

JOSEPH H. STALEY, OF COLUMBUS, INDIANA.

PISTON AND CONNECTING-ROD ALIGNING DEVICE.

Application filed November 24, 1919. Serial No. 340,377.

*To all whom it may concern:*

Be it known that I, JOSEPH H. STALEY, a citizen of the United States, residing at Columbus, in the county of Bartholomew and State of Indiana, have invented a new and useful Piston and Connecting-Rod Aligning Device, of which the following is the specification.

In drilling the holes for shaft and pin in the ends of the connecting rod and also in the cylinder at the time of manufacture and when the holes are rebored for the purpose of repairs later, the holes are frequently out of parallel with each other; and the connecting rod is sometimes so bent in the process of manufacture as to cause the error, but whatever may be the cause, a bending and uneven wear between the piston and cylinder follows and leakage and lost power results.

The errors referred to above are difficult to detect and the object of this invention is to provide a simple apparatus that will be easy to operate and which will show any disalinement between the connecting rod and piston caused by error in drilling the holes or subsequent handling.

The object, also, is to increase the normal bearing support for the connecting rod during the test and to provide an apparatus of sufficient mass and strength that the connecting rod may be bent to correct the errors without removal from the testing apparatus.

The invention is illustrated in the accompanying drawing in which.

Figures 1, 2:
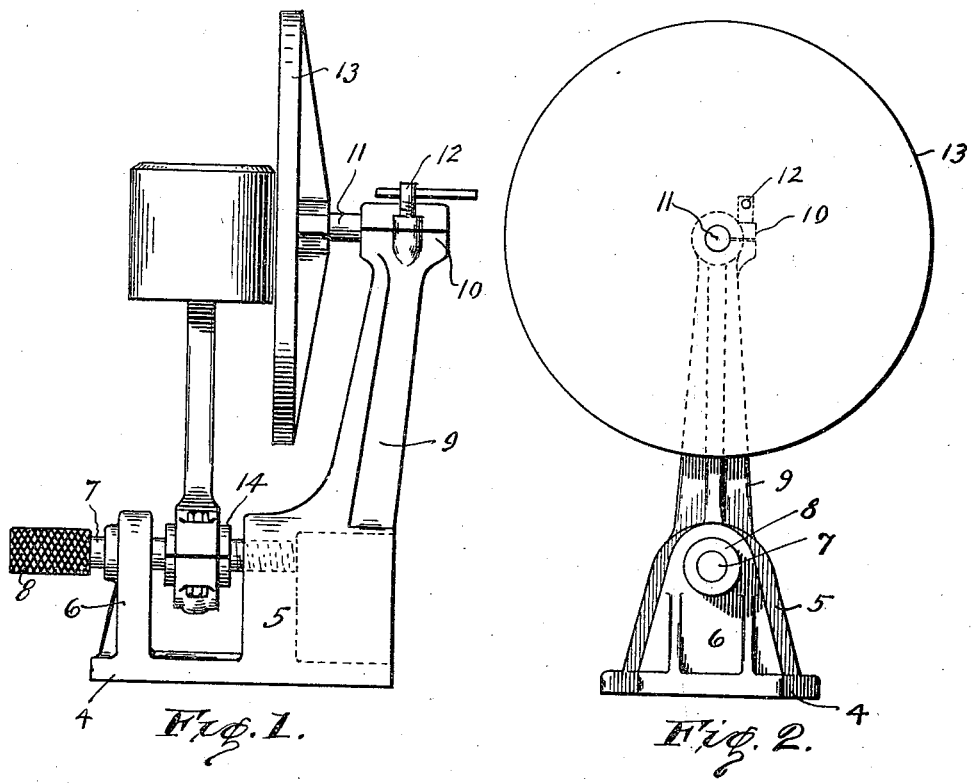
Fig. 1 is an elevation of my device with a connecting rod and piston installed.
Fig. 2 is a like elevation viewed at a quarter turn from that shown in Fig. 1 and, Fig. 3 is a detail showing a bushing used in the bore at the crank-end of the rod.
Figure 3:
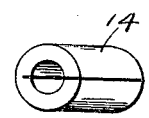

The apparatus has a base 4, with appropriate bolt-holes (not shown) whereby it may be securely fastened to a bench. It also has integral with the base a block 5, and remote from it a short standard 6, through which is a hole in alinement with that in the block 5, to receive the end of shaft 7; the last hole and the end of the shaft to enter it are preferably screw-threaded to retain the shaft, and the opposite end of the latter has a knurled hand-grip 8 for convenience in manipulation.

Rising from the block 5 is a standard 9, terminating in a split box 10, in which a short shaft 11 is journaled. A hand-screw 12, through the split side of the box, is a means for clamping the box so tightly against the shaft 11 that it will be rigidly held. A circular disk 13 is mounted in a fixed manner on the shaft 11.

The axes of shafts 7, and 11, are exactly parallel with each other, and the side of the disk 13 most remote from standard 9, is a plane surface exactly at right angles to the axes of shaft 11.

The application of my invention is as follows: The rod and piston to be tested are properly connected by the wrist-pin designed for them, and the crank-shaft end of the connecting rod is mounted on shaft 7, the difference in bore between the crank-shaft and shaft 7 being accurately filled by a proper split collar or bushing 14, and as the bores for the crank-shaft vary in diameter, particularly when rebored, I provide a series of bushings 14, from which the appropriate one will be selected. These bushings extend beyond the crank shaft end to increase the bearing and the end is bolted rigidly to the bushing which is split longitudinally on one side to cause it to be securely clamped on the shaft 7.

Then the rod and piston are swung around shaft 7, to the vertical position shown in the drawing, and the disk 13, is moved into contact with the piston. The disk is then locked by tightening the hand-screw 12. The rod and piston may be oscillated as a whole across the face of the disk, and the piston on its wrist-pin-connection with the connecting-rod, and any errors in alinement will be shown by a departure of the piston from contact and parallelism with the disk 13. The error may be corrected at once by appropriately bending the rod with the aid of the usual bending-lever in the manner well known to mechanics skilled in this art. The block 5 and standard 6 are made preferably strong to stand the strain of such correction.

I claim:

1. In a device of the character described, a stationary vertical support provided near its upper end with a transverse opening, a testing shaft rigidly secured to the support near its lower end and arranged at a right angle thereto, a spindle slidably mounted within said opening and adapted to be moved longitudinally therein and arranged parallel to said shaft, a disk carried by the spindle and having a flat face, and a split collar arranged upon the testing shaft, said split collar being contractable circumferentially, and adapted to receive thereon a bearing of a connecting rod carrying a piston, whereby said bearing may be clamped to the testing shaft and thereby held against movement to permit of the straightening of the connecting rod while the bearing is held on the testing shaft.

2. In a device of the character described, a stationary support having a transverse opening, a testing shaft connected with the support and arranged at right angles thereto and parallel with said opening, a split collar on the shaft said collar being adapted to receive thereon the bearing of a connecting rod carrying a piston, said collar extending beyond the bearing, a spindle slidable within said opening and adapted to move longitudinally therein, said spindle being parallel with said shaft, means to lock the spindle in a given position, and a disk secured to the spindle and movable bodily therewith toward and away from the piston, said disk having a face perpendicular to said spindle.

In witness whereof I have hereunto set my hand at Columbus, Indiana, this 18th day of November, 1919.

JOSEPH H. STALEY.